(12) United States Patent
Carlier et al.

(10) Patent No.: US 8,321,294 B2
(45) Date of Patent: Nov. 27, 2012

(54) STORE AFFILIATION SYSTEM

(75) Inventors: Claude P. Carlier, Hamden, CT (US);
Colin Meldrum, Berkeley, CA (US);
Tyler A. Strand, Palo Alto, CA (US)

(73) Assignee: Aople Inc., Cupertino, CA (US)

( * ) Notice: Subject to any disclaimer, the term of this patent is extended or adjusted under 35 U.S.C. 154(b) by 0 days.

(21) Appl. No.: 13/361,882

(22) Filed: Jan. 30, 2012

(65) Prior Publication Data

US 2012/0130840 A1    May 24, 2012

Related U.S. Application Data

(63) Continuation of application No. 11/865,638, filed on Oct. 1, 2007, now Pat. No. 8,108,261.

(51) Int. Cl.
*G06Q 30/00* (2006.01)
(52) U.S. Cl. ............................................. 705/26.1
(58) Field of Classification Search .................. 705/26.1
See application file for complete search history.

(56) References Cited

U.S. PATENT DOCUMENTS

| | | | |
|---|---|---|---|
| 5,379,057 A | 1/1995 | Clough et al. | |
| 5,675,362 A | 10/1997 | Clough et al. | |
| 6,091,956 A | 7/2000 | Hollenberg | |
| 6,356,761 B1 | 3/2002 | Huttunen et al. | |
| 6,496,857 B1 | 12/2002 | Dustin et al. | |
| 6,836,667 B1 | 12/2004 | Smith | |
| 7,647,166 B1 | 1/2010 | Kerns | |
| 8,108,261 B2 | 1/2012 | Carlier et al. | |
| 2001/0030660 A1 | 10/2001 | Zainoulline | |
| 2002/0077897 A1 | 6/2002 | Zellner et al. | |
| 2002/0085025 A1 | 7/2002 | Busis et al. | |
| 2002/0102993 A1 | 8/2002 | Hendrey et al. | |
| 2002/0123373 A1 | 9/2002 | Kirbas et al. | |
| 2002/0152179 A1 | 10/2002 | Racov | |
| 2003/0110094 A1 | 6/2003 | Gulliver et al. | |
| 2004/0044566 A1* | 3/2004 | Bostelmann et al. | 705/14 |
| 2004/0169683 A1 | 9/2004 | Chiu et al. | |
| 2005/0091118 A1 | 4/2005 | Fano | |
| 2005/0221841 A1 | 10/2005 | Piccionelli et al. | |
| 2006/0031126 A1 | 2/2006 | Ma et al. | |
| 2007/0214182 A1 | 9/2007 | Rosenberg | |
| 2007/0299737 A1 | 12/2007 | Plastina et al. | |
| 2008/0032719 A1 | 2/2008 | Rosenberg | |

(Continued)

FOREIGN PATENT DOCUMENTS

EP    1 168 879 A    1/2002

(Continued)

OTHER PUBLICATIONS

By Pui-Wing Tam et al.; "Digits"; Wall Street Journal. (Eastern edition). New York, N.Y.: Aug. 10, 2000. p. B.6; http://proquest.umi.com/pqdweb?did=57752474&sid=1&Fmt=3&clientId=19649&RQT=309&VName=PQD.*

(Continued)

*Primary Examiner* — Mila Airapetian

(57) ABSTRACT

Techniques for improved interaction between online retailers and traditional brick-and-mortar retailers that provide patron-accessible networks are disclosed. The location and/or the fact that any given purchase was made from a particular retailer's patron-accessible network can be tracked for various purposes. The invention can facilitate partnering between online retailers (i.e., online stores) and traditional 'brick-and-mortar' business establishments. As an example, the invention can be used to track and give credit for online purchases at an online retailer that are facilitated by a brick-and-mortar retailer.

20 Claims, 10 Drawing Sheets

U.S. PATENT DOCUMENTS

| | | |
|---|---|---|
| 2009/0043667 A1 | 2/2009 | DeYoe et al. |
| 2009/0063293 A1 | 3/2009 | Mirrashidi et al. |
| 2009/0089117 A1 | 4/2009 | Carlier et al. |
| 2010/0161400 A1 | 6/2010 | Snodgrass et al. |

FOREIGN PATENT DOCUMENTS

| | | |
|---|---|---|
| JP | 2003-308370 | 10/2003 |
| JP | 2004-062812 | 2/2004 |
| JP | 2006-107149 | 4/2006 |
| JP | 2007-509388 | 4/2007 |
| KR | 2006-94394 | 8/2006 |
| WO | WO 2005/032105 | 2/2005 |

OTHER PUBLICATIONS

Tam et al., "Digits", Wall Street Journal, (Eastern edition), Aug. 10, 2000, 6 pgs.

Office Action for U.S. Appl. No. 11/865,638, mailed May 5, 2011.

Notice of Allowance for U.S. Appl. No. 11/865,638, mailed Sep. 28, 2011.

* cited by examiner

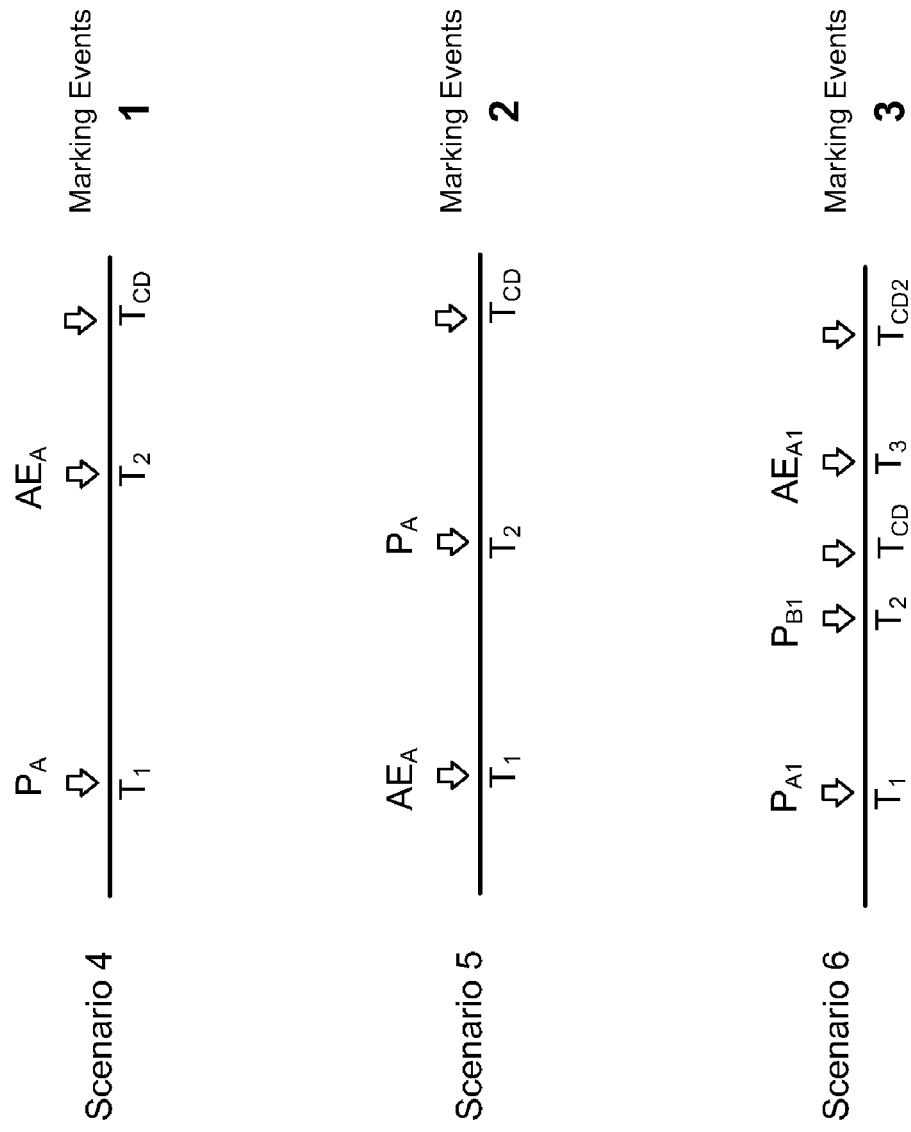

STORE AFFILIATION SYSTEM

CROSS-REFERENCE TO RELATED APPLICATION

This application is a continuation of U.S. application Ser. No. 11/865,638, filed Oct. 1, 2007, and entitled "Store Affiliation System," now U.S. Pat. No. 8,108,261, which is hereby incorporated herein by reference.

BACKGROUND OF THE INVENTION

Generally, online retailers lack a physical location. Instead, they substitute an 'online presence', typically web pages or other user-interfaces that customers can access using an application such as a web-browser or media management application running on a personal computer or other device (e.g., a portable media player).

Traditional retailers (sometimes called 'brick-and-mortar' retailers) often have an online presence as well, selling products online as well as in a traditional retail environment. The typical method for accessing an online retailer, whether or not the retailer has traditional retail stores, is over the Internet. However, it is becoming more common for traditional retail establishments to install networks that are accessible by their customers while in that retail establishment. For instance, it is now fairly common for coffee shops and fast food restaurants to have patron-accessible wireless networks such (e.g., WiFi networks) that can be accessed by anyone with a wireless computer or other wireless device, though sometime a fee or membership is required to utilize the wireless networks.

Presumably, the installation of a retail establishment patron-accessible network encourages the patrons of a retail establishment to connect to the Internet or private networks (e.g., VPNs) from that retail establishment's network. There are many reasons why the patrons of any particular retail establishment might want to connect to a retail establishment's patron-accessible network. For example, a patron might want to check an email account or 'web-surf'. It is also conceivable that a patron will want to purchase something online using the retail establishment patron-accessible network. If so, that patron will typically connect to that retail establishment patron-accessible network, access an online store over the network, make the desired purchase, and then leave the online store. Conventionally, the online store will treat that patron's purchase as if it were any other purchase made by that patron from anywhere on the Internet. The fact that the online purchase was made from a retailer's patron-accessible network is irrelevant to the purchase.

SUMMARY OF THE INVENTION

The invention pertains to techniques for improved interaction between online retailers and traditional brick-and-mortar retailers that provide patron-accessible networks. The location and/or the fact that any given purchase was made from a particular retailer's patron-accessible network can be tracked for various purposes. The invention can facilitate partnering between online retailers (i.e., online stores) and traditional 'brick-and-mortar' business establishments. As an example, the invention can be used to track and give credit for online purchases at an online retailer that are facilitated by a brick-and-mortar retailer.

As a computer implemented method for purchases made at an online store, one embodiment can, for example, include at least the acts of: detecting a online store customer marking event for a customer at an online store, marking the online store customer as associated with the online store affiliate, and subsequently paying a bounty to the online store affiliate for purchases made from the online store by the marked online store customer.

As a computer implemented method for marking an online store customer, one embodiment can, for example, include at least the acts of: detecting an online store customer marking event for a customer at an online store and marking an online store customer in response to the online store customer marking event.

As a non-transitory computer-readable medium including at least computer program code stored thereon for paying a bounty to an online store affiliate for purchases made at an online store, one embodiment can, for example, include at least: computer program code for detecting an online store customer marking event for a customer at an online store when the online store customer accesses the online store over an online store affiliate network; computer program code for marking the online store customer as associated with the online store affiliate, and wherein the marking of the online store customer expires after a predetermined period of time; and computer program code for subsequently paying a bounty to the online store affiliate for purchases made from the online store by the marked online store customer.

As a non-transitory computer-readable medium including at least computer program code stored thereon for paying a bounty to an online store affiliate for purchases made at an online store, one embodiment can, for example, include at least: computer program code for detecting an online store customer marking event for a customer at an online store when the online store customer accesses the online store over an online store affiliate network; computer program code for marking the online store customer as associated with the online store affiliate; and computer program code for subsequently paying a bounty to the online store affiliate for purchases made from the online store by the marked online store customer. Additionally, the computer program code for marking of the online store customer can include at least: computer program code for determining the location of an online store affiliate where the marking event of the online store customer occurred; and computer program code for marking the online store customer with information specific to the location of the online store affiliate.

As a computer-implemented method for paying a bounty to an online store affiliate for purchases made at an online store, one embodiment can, for example, include at least: detecting an online store customer marking event for a customer at an online store; marking the online store customer as associated with the online store affiliate; and subsequently paying a bounty to the online store affiliate for purchases made from the online store by the marked online store customer. The paying of the bounty to the online media store affiliate for purchases made from the online store by the marked online store customer can include at least (i) retrieving an obligation configuration, and (ii) paying the bounty to the online store affiliate based on the obligation configuration.

As a system, one embodiment can, for example, include at least a server computer device that supports an online store and that is configured to couple to a data network for access to an affiliate establishment data network. The server computer device can be configured to pay a bounty to an online store affiliate for purchases made at the online store. In doing so, the server computer device can be further configured to perform the operations of: detecting an online store customer marking event for a customer at the online store when the online store customer accesses the online store over the online store affiliate network; marking the online store customer as associated with the online store affiliate, and wherein the marking of the online store customer expires after a predetermined period of time; and subsequently paying a bounty to the online store affiliate for purchases made from the online store by the marked online store customer.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 9(a) and 9(b) are diagrams of examples of detecting and recording marking events.

DETAILED DESCRIPTION OF THE INVENTION

The invention pertains to techniques for improved interaction between online retailers and traditional brick-and-mortar retailers that provide patron-accessible networks. The location and/or the fact that any given purchase was made from a particular retailer's patron-accessible network could be commercially important, both to the online retailer and the retail establishment that supplied the patron-accessible network.

The invention pertains to techniques for partnering between online retailers (i.e., online stores) and traditional 'brick-and-mortar' business establishments. More specifically, the invention pertains to techniques for tracking and giving credit for online purchases facilitated by a brick-and-mortar retailer.

The present application is described in the context of a generic online store and a generic retail establishment. However, the invention can be used with any kind of online store, for example an online retailer (e.g., an online media store), and any kind of retail establishment, for example, a coffee shop, restaurant or other retail store. In addition, in one embodiment, the invention can be used to form an online store affiliate relationship between an online store and an online service provider (e.g., an ISP or cellular phone service provider.)

In the various figures described below, a relationship between an online store and one or more online store affiliates is described. An online store affiliate is an entity, typically a business entity, which forms a business relationship with an online store. The online store can, for example, host a co-branded online store with the online store affiliate, where the co-branded online store can prominently display the online store affiliate's logo, promotions, and/or products. In a second example, the online store affiliate can direct its customers to the affiliated online store to purchase products or services over the online store affiliate's patron-accessible data network. A third example of an online store/online store affiliate relationship can be an online store affiliate selling or giving away product codes (e.g., gift cards) that are redeemable at the online store. Clearly, other online store/online store affiliate partnerships are possible, and the preceding examples are not intended to limit the scope of the present invention.

Figure 1:
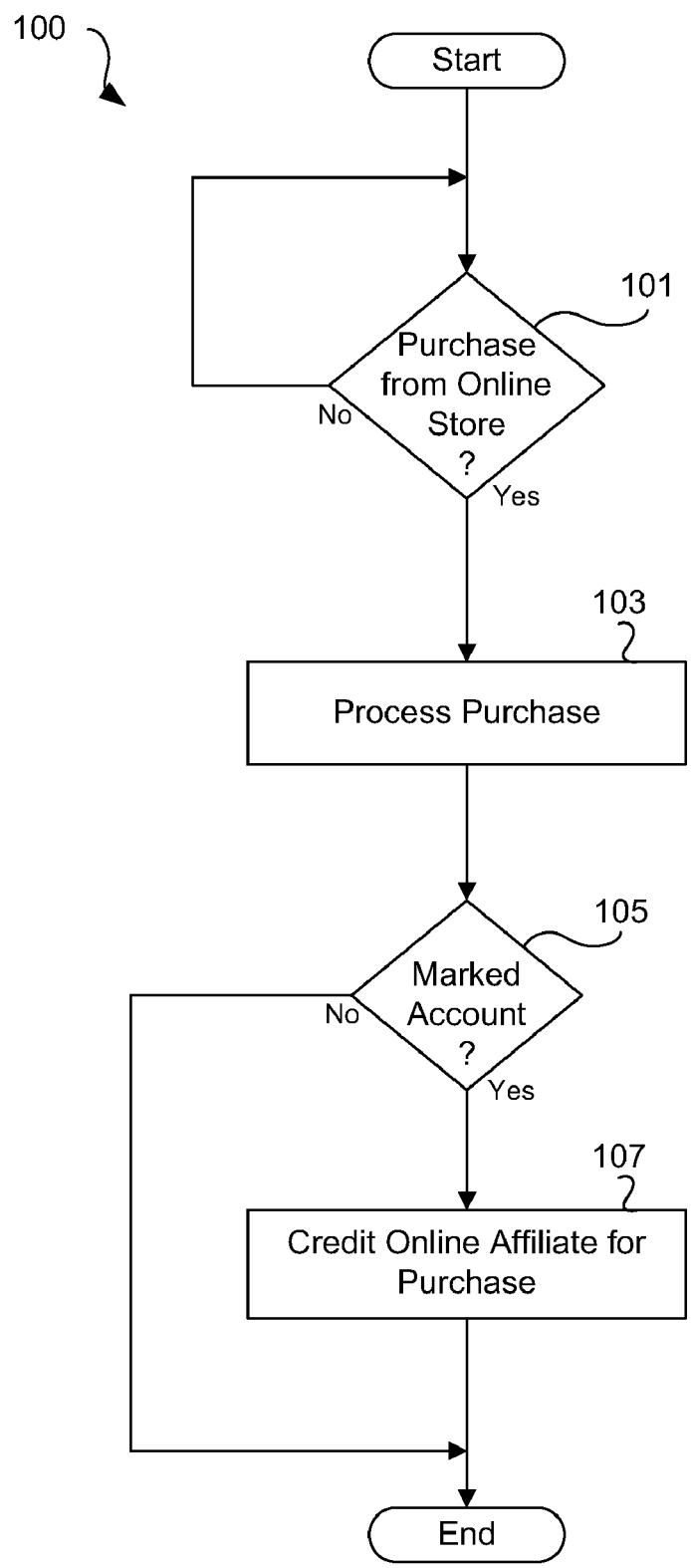
FIG. 1 is a flow diagram of an online store affiliate crediting process according to one embodiment of the invention.

FIG. 1 is a flow diagram of an online store affiliate crediting process 100 according to one embodiment of the invention. In one embodiment of the invention, an online store affiliate receives some form of credit when the online store affiliate's customers interact with an online store. The credit given can be monetary, for instance a percentage of the revenue generated from purchases made by the online store affiliate's customers from the online store over a given period. Alternately, the credit can be administrative, for instance a notation or marking on a customer account when that a customer has accessed an online store over an online store affiliate's network.

The online store affiliate crediting process 100 begins with a decision 101 that detects a purchase from an online store. The purchase can be made by a customer of the online store, that is, a patron of the online store who has an online store customer account with the online store. Typically, the customer account is unique to a particular customer (although a customer may have multiple accounts.) The online store customer account contains identifying information about the customer and can contain payment and/or billing information about the customer. For example, an online media store customer can purchase media content from the online media store using credit card information stored in the customer's online store customer account to pay for the purchase. Once a purchase has been detected by decision 101, the online store affiliate crediting process 100 continues by processing 103 the purchase detected by decision 101. Typically, processing 103 involves such steps as collecting payment information from the purchaser, processing the payment information, and arranging for the product or service purchased to be delivered to the purchaser. Next, a decision 105 determines if the online store account used to make the purchase is an online store affiliate-marked customer account. A customer account can be marked as an online store affiliate customer, for example, if a purchase is made from the online store over a network operated by the online store affiliate. For example: a customer enters a coffee shop that has an affiliate relationship with an online media store and purchases media content using his laptop computer over the coffee shop's wireless network. The fact that the purchase was made over the coffee shop wireless network is noted at the online media store and the customer's online media store account is marked (i.e., affiliate-marked) to reflect that the particular customer's status is as an online store affiliate customer.

If the decision 105 does not detect that the customer account is marked, then the online store affiliate crediting process 100 can end without any credit to the online store affiliate. However, if the decision 105 determines that the customer account is an online store affiliate-marked customer account, then the online store affiliate crediting process 100 continues to block 107. Once it has been determined 105 that the account is an online store affiliate-marked account, then the online store affiliate can be credited 107 for the purchase. In one embodiment of the invention, the online store affiliate credit 107 is a 'bounty' on the purchase 101. The county can, for example, be a percentage of the sale price.

Figure 2:
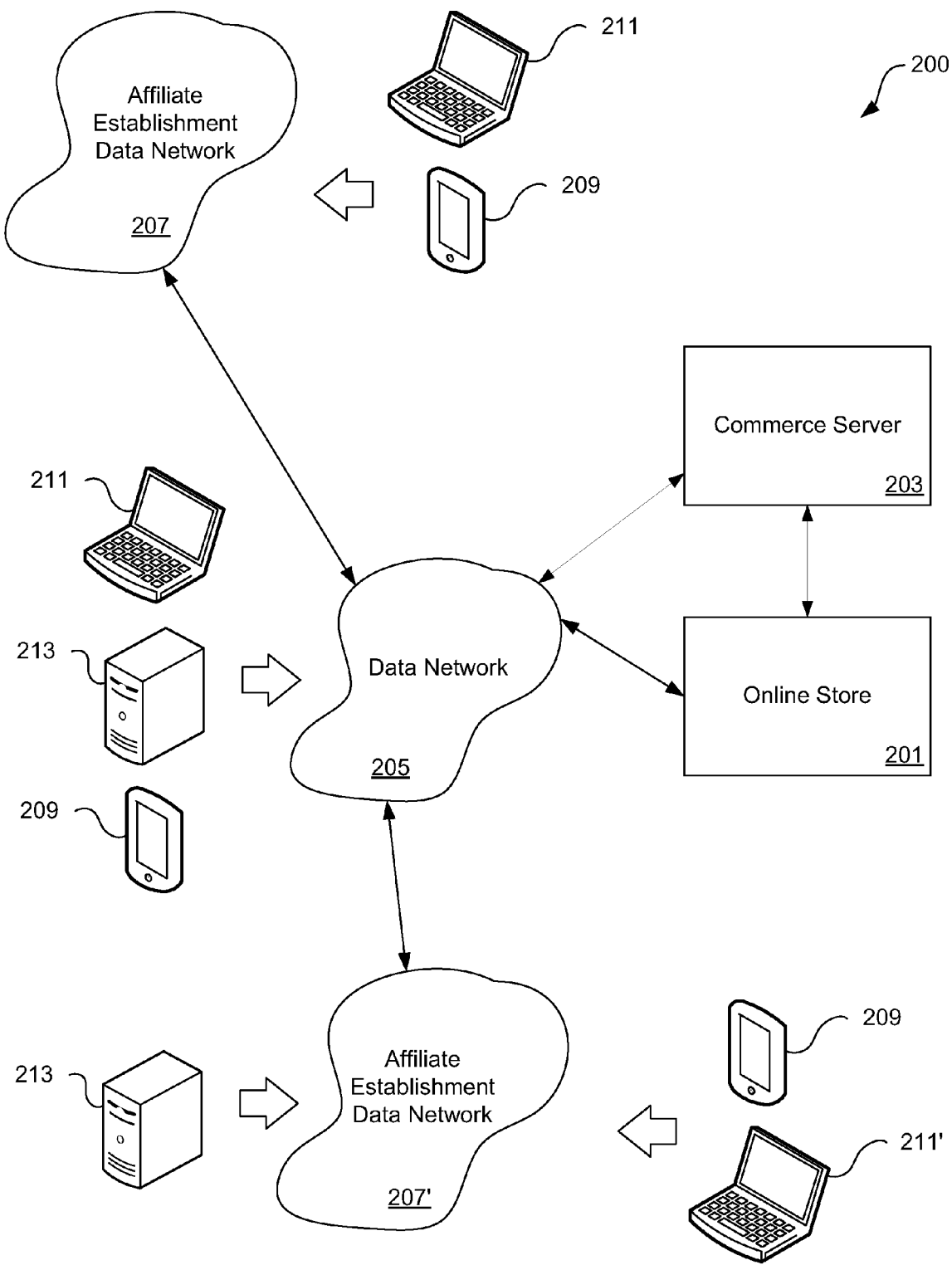
FIG. 2 is a diagram of an online store affiliate commerce system according to one embodiment of the invention.

FIG. 2 is a diagram of an online store affiliate commerce system 200 according to one embodiment of the invention. The online store affiliate commerce system 200 can be used, for example, to implement the online store customer affiliate crediting process 100 of FIG. 1.

The online store affiliate commerce system 200 includes an online store 201 and a commerce server 203. The online store 201 can be any type of online retailer, dealing in goods and/or services. In one embodiment of the invention, the online store 201 is an online media store. An example of an online media store is iTunes™ store, operated by Apple Inc. of Cupertino, Calif. In the online store affiliate commerce system, commerce server 203 can be used to (i) keep track of the online store 201 customer accounts, (ii) process purchases made at the online store 201, and/or (iii) perform other commerce-related functions. The commerce server 203 is shown separate from the online store 201 for the sake of discussion—clearly either the online store 201, the commerce server 203 or both can be implemented using any number of servers, including the case where the online store 201 and the commerce server 203 are the same server.

The online store 201 and the commerce server 203 are connected to a data network 205, for example, the Internet. Also connected to the data network 205 are any number of online store affiliate establishment data networks 207. Typically, an online store affiliate establishment data network 207 is a patron-accessible network, located in a brick-and-mortar business establishment that has an affiliate relationship with the online store 201. In one embodiment of the invention, the online store affiliate establishment data network 207 is a patron-accessible wireless network (e.g., a WiFi or WiMax network) operating in an online store affiliated retail establishment for use by patrons of the online store affiliated retail establishment. In another embodiment of the invention, the online store affiliate establishment data network 207 can be a cellular data network, and the cellular service provider can be the online store affiliate. In still another embodiment of the invention, the online store affiliate establishment data network 207 can be operated by a third-party wireless network provider. In this embodiment, the online store affiliate can be the third-party wireless network provider. However, there is no reason why there cannot be multiple online store affiliates involved at the same time. For example, in the case where a coffee shop patron uses a wireless electronic device to purchase media content from an online media store over a third-party administered wireless network, both the coffee shop and the third-party wireless network administrator can be affiliated with the online media store.

Interactions with the online store 201 can be accomplished using any device that can interact with either the data network 205 or an online store affiliate data network 207. FIG. 2 shows a number of client devices—including wireless-enabled portable devices 209, laptop computers 211, and desktop computers 213—that can access the online store 201 over an online affiliate establishment data network 207 or over the data network 205. Wireless-enabled portable devices 209 can include, for example, WiFi- or cellular digital media players, hiptop computers, palm-top computers, mobile phones, and PDAs. One example of a wireless-enabled portable device is the iPod™ touch media player, produced by Apple Inc., which can connect to WiFi wireless networks. One example of a mobile phone is the iPhone™, also produced by Apple Inc., which can connect to both cellular networks and WiFi networks. Laptop computers 211 and desktop computers 213 that can connect to the online store 201 can be either wireless-enabled or physically connected (e.g., via a modem, broadband network, or Ethernet network.)

Online store affiliate networks 207 can be capable of informing the online store 201, the commerce server 203, or both, of location information. The location information can be the specific geographical location of the online store affiliate, or can be a particular online store affiliate. In one implementation, when an online affiliate has multiple store locations, the particular location can be identified by a store number associated with the particular online affiliate. For example, if a laptop 211' accesses the online store 201 over affiliate establishment data network 207', the affiliate establishment data network 207' can inform the online store that the laptop 211' is physically located in the online affiliate establishment that provides the online affiliate data network 207'. This allows the tracking and recording of online sales made from particular locations (e.g., specific geographical location or particular online store affiliate).

In one embodiment of the invention, at least one of the online store affiliate establishment data networks 207 has a local cache server (not shown). Additional details of an example of an affiliate establishment data network 207 are provided in U.S. patent application Ser. No. 11/849,865, filed Sep. 4, 2007, entitled "DYNAMIC PRESENTATION OF LOCATION-SPECIFIC INFORMATION", which is herein incorporated by reference.

In another embodiment of the invention, at least one of the online store affiliate establishment data networks 207 is a pay-as-you-go wireless network, (e.g., a wireless network that requires a credit card or other form of payment before allowing access to the network.)

In still another embodiment of the invention, at least one of the online store affiliate establishment data networks 207 is a pay-as-you-go wireless network that is free for patrons who interact with a pre-approved network location, such as the network location of the online store 201. For example, a coffee shop with a pay-as-you-go wireless network can allow its patrons to access an affiliated online media store over the coffee shop's wireless network free-of-charge, while still charging for other uses of the pay-as-you-go wireless network.

Figure 3:
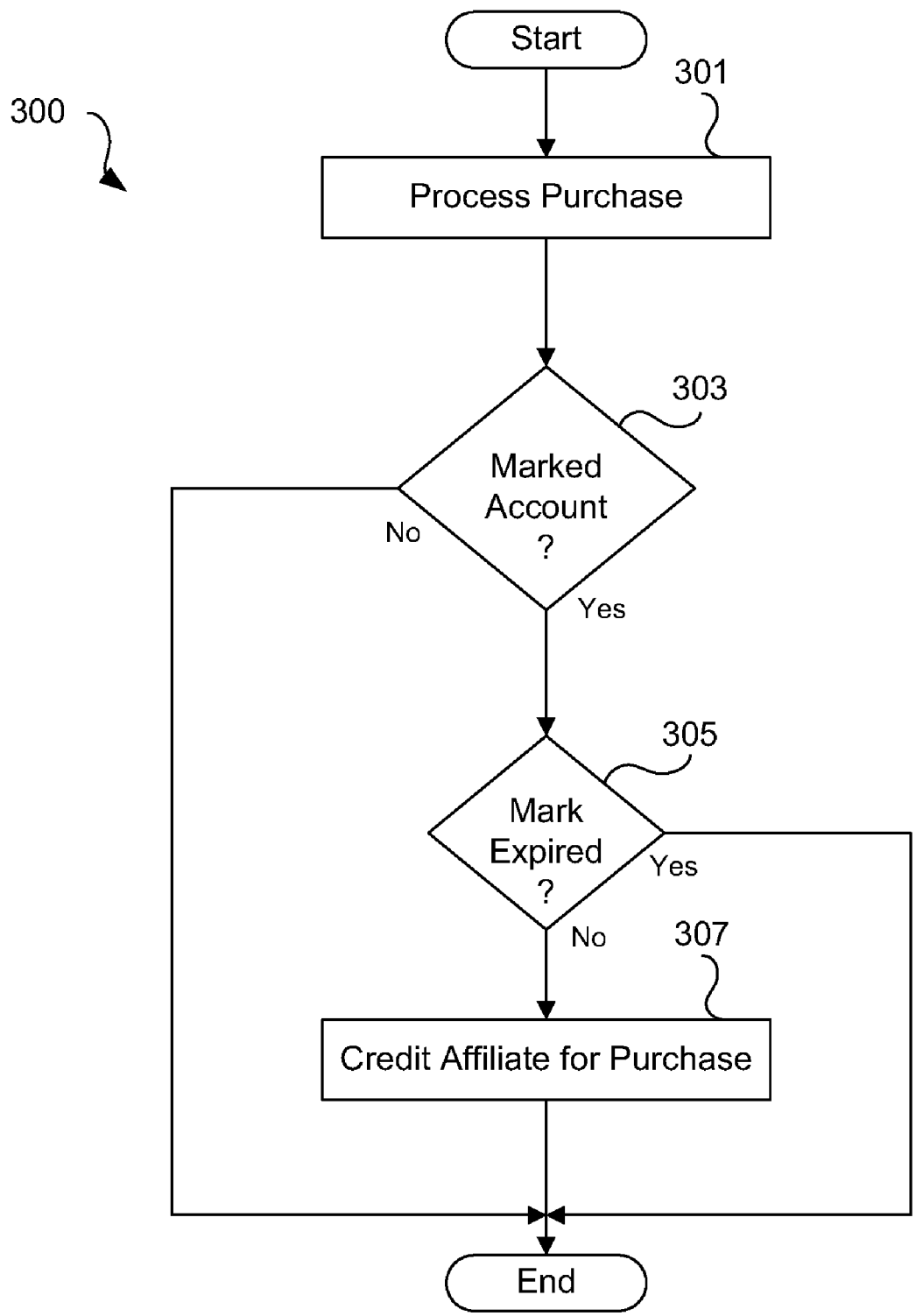
FIG. 3 is a flow diagram of an online store affiliate crediting process according to one embodiment of the invention.

FIG. 3 is a flow diagram of an online store affiliate crediting process 300 according to one embodiment of the invention. The online store affiliate crediting process can, for example, be performed over the online store affiliate commerce system 200 as described in FIG. 2. In one embodiment of the invention, an online store affiliate receives some form of credit when the online store affiliate's customers interact with an online store. The credit given can be monetary, for instance a percentage of the revenue generated from purchases made by the online store affiliate's customers from the online store over a given period. Alternately, the credit can be administrative, for instance a notation or marking on a customer account that a customer has accessed an online store over an online store affiliate's network.

The online store affiliate crediting process 300 can begin with a purchase 301 from an online store, for example by using one of the wireless-enabled portable devices 209 to access the online store 201 (both described in FIG. 2.) The purchase 301 is made by a customer of the online store, that is, a patron of the online store who has an online store customer account with the online store. Typically, the customer account is unique to a particular customer (although a customer may have multiple accounts.) The online store customer account contains identifying information about the customer and can contain payment and/or billing information about the customer. For example, an online media store customer can purchase media content (e.g., an AAC or MP3 file) from the online media store using credit card information stored in his online store customer account to pay for the purchase. Next, a decision 303 determines if the account used to make the purchase is an online store affiliate-marked customer account. As discussed above, a customer account can be marked as an online store affiliate customer, for example, if a purchase is made from the online store over a network operated by the online store affiliate, for example one of the online store affiliate data networks 207 of FIG. 2.

For example, a customer that enters a coffee shop which has an affiliate relationship with an online media store and purchases media content using his laptop computer over the coffee shop's wireless network can be marked. More particularly, the fact that the purchase was made at the coffee shop (e.g., over the coffee shop wireless network) is noted at the online media store and the customer's online media store account is marked to reflect that particular customer's status as an online store affiliate customer.

If the decision 303 does not detect that the customer account is affiliate-marked, then the online store affiliate crediting process 300 can end without further action. However, if the decision 303 determines that the customer account is an online store affiliate-marked account, then a decision 305 determines if the online store affiliate marking has expired. For example, the online store affiliate-marking on the online store affiliate-marked account can expire after a specified time period has elapsed since the last affiliate-marking on the affiliate-marked customer account.

In one embodiment of the invention, an online store customer account can be affiliate-marked when an online store affiliate facilitates a purchase from an online store. Generally speaking, a purchase from an online store is facilitated by an online store affiliate whenever the purchase from the online occurs because of the efforts of the online media store affiliate. Online store affiliate facilitation can occur, for example, when a patron of an online store affiliate makes a purchase from an affiliated online store, i.e., via the online store affiliate's wireless network. Online store affiliate facilitation can also occur, for example, when an online store customer makes a purchase using a code (e.g., on a gift card) purchased from an online store affiliate.

Returning to the online store affiliate crediting process 300, if the decision 305 determines that the affiliate marking has expired, then the online store affiliate crediting process 300 can end without further action. On the other hand, if the decision 305 determines that the affiliate marking has not expired, then the online store affiliate is credited 307 for the purchase 301. In one embodiment of the invention, the online store affiliate credit 307 is a 'bounty' on the purchase 301, for example, a percentage of the sale price, a predetermined price, or some other benefit.

Figure 4:
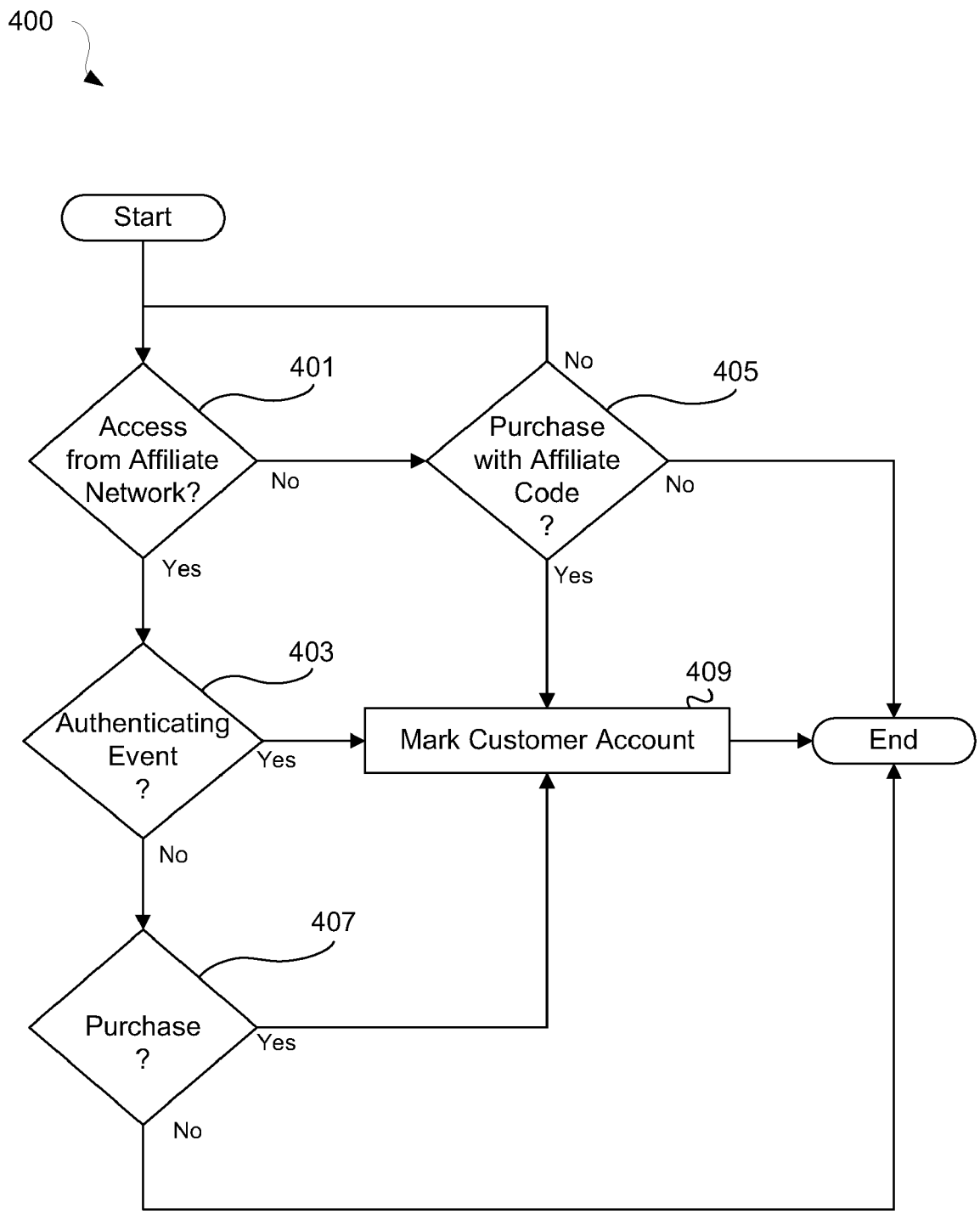
FIG. 4 is a flow diagram of online store affiliate obligation application process according to one embodiment of the invention.

FIG. 4 is an online store customer account marking event detection process 400 according to one embodiment of the invention. The online store customer account marking event detection process 400 can occur, for example, when an interaction with the online store 201 of FIG. 2 is detected at the online store 201. Examples of online store interactions can include, for example, accessing an online store with a Web browser or other application, browsing an online store, or searching for a product on an online store. If an interaction with an online store is important to the online store, then that interaction can be logged (i.e., recorded in a log) by the online store.

In one embodiment, online store interactions that are important enough to be recorded in a customer account are referred to as marking events. Marking events that are detected by the online store customer account marking event detection process 400 can include online store authenticating events that occur in online store affiliate networks, online store purchases that originate from online store affiliate networks, and/or online store purchases made with online store affiliate codes (e.g., gift cards or promotions). Clearly, marking events detected by the online store customer account marking event detection process 400 can vary substantially depending on the needs and/or wants of a particular online store and are not limited to those described below.

The online store customer account marking event detection process 400 begins with a decision 401 that detects if an interaction with an online store originated from an online store affiliate establishment data network. For example, referring back the online store affiliate commerce system 200 of FIG. 2, decision 401 could detect if an online music store customer operating a laptop computer 211 accessed an online store 201 over an affiliate establishment data network 207.

If decision 401 detects that the interaction with the online store originated from an online store affiliate establishment data network, the online store account marking event detection process 400 continues to decision 403 which detects if the interaction with the online store is an authenticating event. An authenticating event can be defined as any event that positively identifies an online store customer. A "login" to a customer account is one example of an authenticating event. In one embodiment of the invention, a wireless enabled mobile device executes an authenticating event simply by accessing an online store. One specific example of an authenticating event is when a wireless enabled mobile device that is associated with a unique customer account (e.g., a mobile phone number or an online store account) accesses an online store. If decision 403 determines that the interaction with the online store is an authenticating event, then the online store customer account marking event detection process 400 continues to block 409 and subsequent blocks.

If, on the other hand, decision 401 detects that the interaction with the online store originated from a data network that is not associated with an online store affiliate establishment, then a decision 405 detects if the interaction with the online store was a purchase made using an online store affiliate code (e.g., a gift card or promotion code obtained from an online store affiliate). Online store affiliate codes can be purchased or given away by online store affiliates. Examples of online in affiliate codes include: online store gift cards sold by an online store of affiliate, online store affiliate gift cards that can be redeemed at an online store, and/or online store affiliate promotional codes (i.e., codes that are given away rather than sold). One example of an online store affiliate gift card is a gift card sold by an online affiliate that is redeemable on an online store for a specific online store product or service (i.e., product-specific or content-specific codes). If decision 405 detects that the interaction with the online store was a purchase made using an online store affiliate code, then the online store customer account marking event detection process 400 continues to block 409 and subsequent blocks. On the other hand, if decision 405 detects that the interaction with the online store was not made using an online store affiliate code, then the online store customer account marking event detection process 400 can end.

If decision 403 detects that the interaction with the online store is not an authenticating event, then the online store customer account marking event detection process 400 continues to decision 407, which determines if the interaction with the online store is a purchase from the online store. If decision 407 determines that the interaction with the online store is a purchase, then the online store customer account marking event detection process 400 continues to block 409 and subsequent blocks. If on the other hand decision 407 determines that the interaction with the online store is not a purchase, then the online store customer account marking event detection process 400 can end.

Continuing with the online store customer account marking event detection process 400, the online store customer account associated with the interaction with the online store can be marked 409. In one embodiment of the invention, marking 409 creates an online store affiliate-marked account as described above in FIGS. 1 and 3. The marking 409 of the customer account can include, for example, one or more of: a record of what type of marking event occurred, the online customer affiliate location where the marking event occurred (if applicable), the time and date of the marking event, and, in the case of a purchase, what item or service was purchased, and/or whether the purchase was made using an online affiliate code. Of course, in order to mark 409 the online customer account associated with the interaction with the online store, the online store customer account must be known. In the case that block 409 is reached due to the detection 403 of an authenticating event, the online store customer account is known due to the authenticating event. In the case that block 409 is reached from either a purchase as detected in block 407 or a purchase with an affiliate code as detected in block 405, the customer account is known due to the purchase from the online store.

It should be note that the information tracked or recorded when marking a customer can similarly be tracked or recorded for purchases, regardless of whether the customer is or will be marked. For example, when a customer makes a purchases at an affiliate store location, the information captured can include: location of customer (e.g., city, region, store number, etc.), item, amount and/or type of purchase, time and date of purchase, and/or whether the purchase was made using an online affiliate code.

An online store can allow potential and existing customers to browse and shop anonymously, i.e., without logging in to an account. In this case, online store customer account marking events can, for example, be detected but not recorded. Thus, marking events associated with anonymous interactions (i.e., interactions where a customer account associated cannot be determined) with an online media store can be stored (for example, in a web browser session cookie) until such a time as when the anonymous customer logs into his or her customer account.

Figure 5:
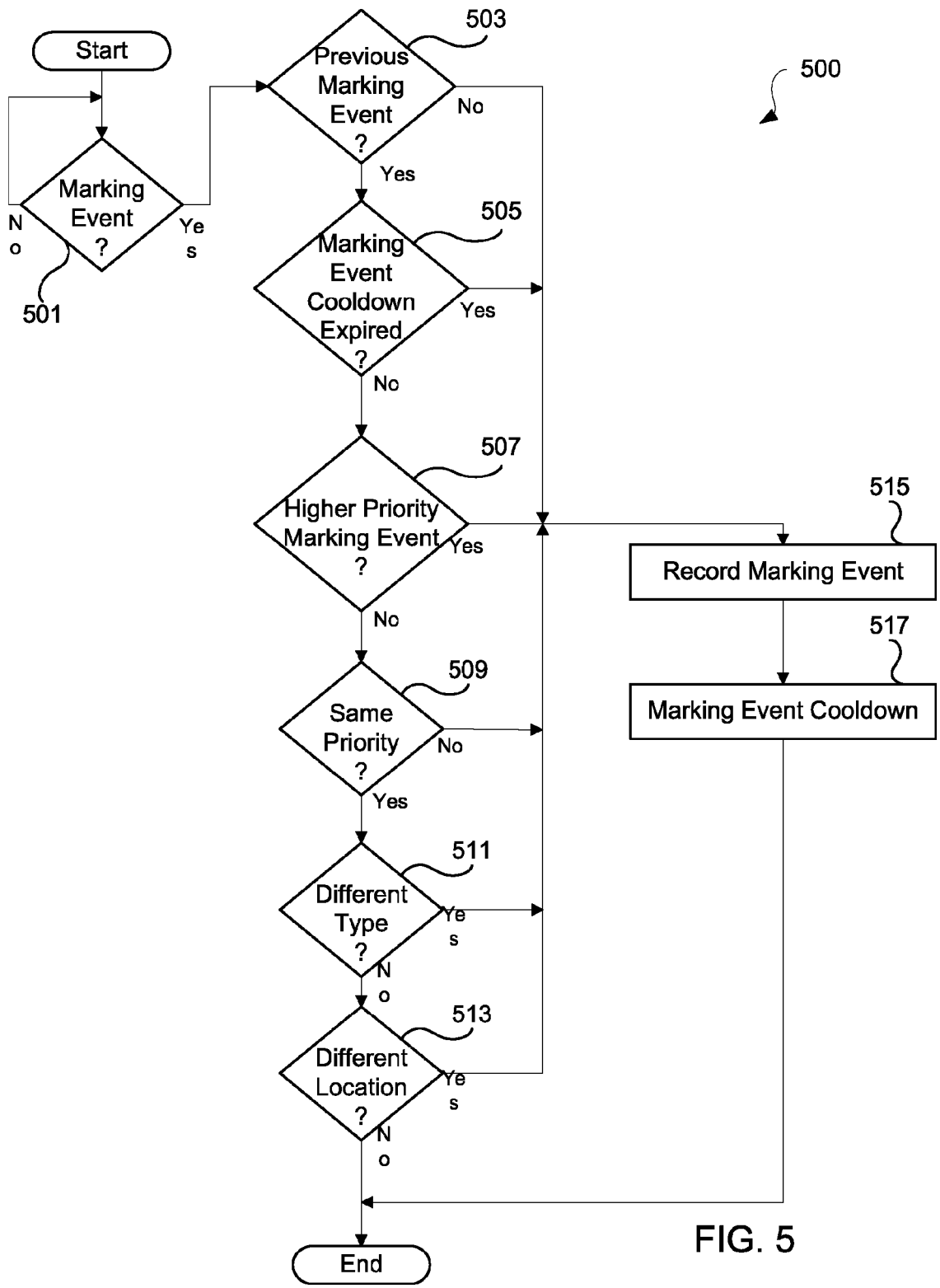
FIG. 5 is a flow diagram of an affiliate bounty payment process according to one embodiment of the invention.

FIG. 5 is a flow diagram of an online store marking event logging process 500 according to one embodiment of the invention. The online store marking event logging process 500 can be used to mark 409 online store customer accounts as described in FIG. 4. The online store marking event logging process 500 can be implemented such that only unique marking events are logged in order to prevent the recording of redundant marking events.

The online store marking event logging process 500 begins with a decision 501 that detects if a marking event has occurred as well as the online store customer account associated with the marking event. In one embodiment of the invention, marking events are detected at an online store, for example be online store 201 of FIG. 2. Marking events according to one embodiment are described in detail in FIG. 4 above.

If a marking event is detected by decision 501, the online store marking event logging process continues to decision 503, which examines the customer account associated with the marking event to determine if a previous marking event has been recorded. If decision 503 determines that there is no previous marking event, then the online store marking event logging process 500 continues to block 515 and subsequent blocks. If on the other hand, decision 503 determines that there is a previously recorded marking event, then the online store marking event logging process 500 continues to a decision 505 that determines if the marking event cool down timer has expired. The marking event cool down timer can be used to prevent excessive logging of redundant marking events. The marking event cool down timer can be set to a time period of, for example, one day. If decision 505 determines that the marking event cool down has expired, the online store marking event logging process 500 continues to block 515 and subsequent blocks. On the other hand, if decision 505 determines that the marking event cool down has not expired, then the online store marking event logging process 500 continues to decision 507 which determines if the marking event has a higher priority than the previous marking event. Marking event priorities can be set depending on the importance of different marking event types. For example, in the online store customer account marking detection process 400 of FIG. 4 above, authenticating events and purchases can have different priorities.

If decision 507 determines that the marking event has higher priority than the previous marking event, the online store marking event logging process 500 continues to block 515 and subsequent blocks. On the other hand, if decision 507 determines that the marking event does not have a higher priority than the previous marking event, then the online store marking event logging process 500 continues to a decision 509 that determines if the marking event has the same priority as the previous marking event. For example, a purchase from an online store over an online store affiliate data network can have the same priority as a purchase from an online store using an online store affiliate code. If decision 509 determines that the marking event does not have the same priority as the previous marking event, then the online store marking event logging process 500 continues to block 515 and subsequent blocks. On the other hand, if decision 509 determines that the marking event does have the same priority as the previous marking event, the online store marking event logging process 500 continues to a decision 511 which determines if the marking event is of a different type than the previous marking event. If decision 511 determines that the marking event is the same type as the previous marking event, the online store marking event logging process 500 continues to block 513 and subsequent blocks. However, if decision 511 determines that the marking event is of a different type than the previous marking event, the online store marking event logging process 500 continues to block 515 and subsequent blocks. Next, a decision 513 determines if the marking event came from a different location than the previous marking event. For example, in the case where purchases from an online store that are made using online store affiliate networks are marking events, purchases made over different online store affiliate networks can be detected by decision 513. If decision 513 detects that the marking event did not come from a different location than the previous marking event, the online store marking event logging process 500 ends. On the other hand, if decision 513 detects that the marking event came from a different location than the previous marking event, the online store marking event logging process 500 continues to block 515 and subsequent blocks.

Continuing with the online store marking event logging process 500, a marking event that meets the proper criteria is recorded 515 (i.e., logged), for example, by marking 409 an online store customer account as described in FIG. 4. Next, the marking event cooldown timer is reset 517 and the online store marking event logging process 500 can end.

Figure 6:
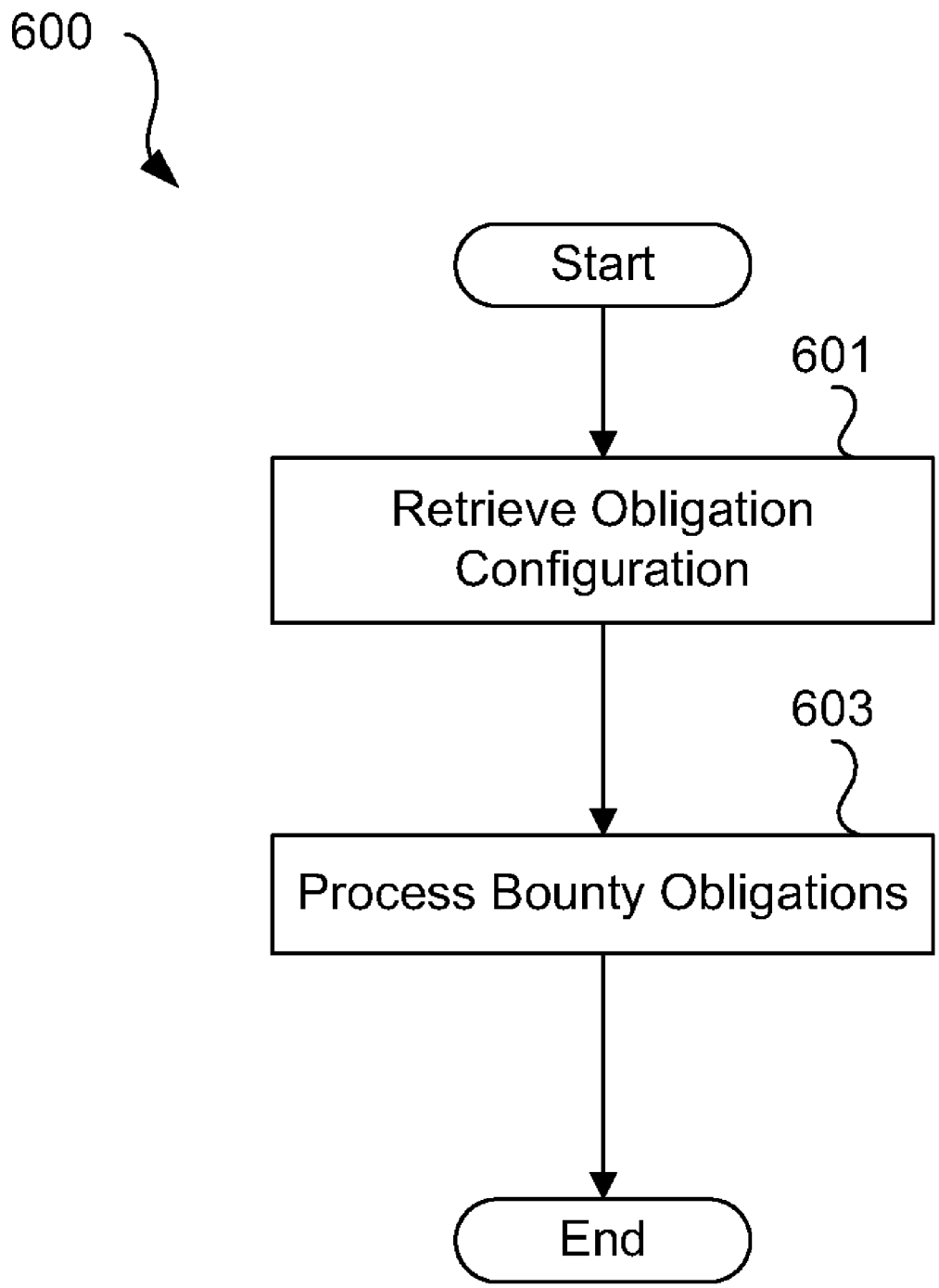
FIG. 6 is a flow diagram of a customer account marking process according to one embodiment of the invention.

FIG. 6 is a flow diagram of an online store affiliate obligation application process 600 according to one embodiment of the invention. The online store affiliate obligation application process 600 can occur, for example, during the crediting 307 of FIG. 3. The online store affiliate obligation application process 600 can be applied to an online store purchase when a purchase is made from an online store using an online store affiliate-marked customer account.

Online store affiliate obligations are duties owed by an online store to an online store affiliate. Various types of online store affiliate obligations are possible, including bounty obligations and recording obligations. A bounty obligation to an online affiliate (i.e., an obligation to pay a fee to the online affiliate) can be incurred, for example, whenever a purchase is made by an online store affiliate-marked customer. Recording obligations, conversely, can include keeping track of online store transactions made by online store affiliate-marked customers. For example, an online store can make a deal with an online store affiliate that, if a one or some quantity of product is purchased from the online store by online affiliate-marked customers, the online affiliate will receive a bounty. A recording obligation does not have to include a bounty obligation, however. For instance, a recording obligation can be incurred when an online store affiliate sells an online store gift card—in this case there can be an obligation to record purchases made from the online store using affiliate-sold online store gift card, but to withhold bounty payments to the online store affiliate until the online store gift card funds have been spent.

Further, online store affiliate obligations to online store affiliates can be incurred for different reasons. For example, an online store may incur an online store affiliate obligation to one of its online store affiliates when an online store affiliate-marked customer purchases a product or service from the online store. Alternately, an online store may incur an online store affiliate obligation to an online store affiliate when an online store affiliate customer purchases a product or service from the online store using an online store affiliate-supplied code (e.g., an online store affiliate promotional code or gift card). Online store affiliate-obligations can also have associated obligation timers that expire after a specific period of time. After the obligation timer for an online store affiliate obligation has expired, the online store is no longer obligated The online store affiliate obligation application process 600 allows for a wide variety of bounty obligations to be applied depending on a wide variety of situations. For example, bounty obligations can vary with sale location (i.e., be different in different states or countries), vary depending on product sold (e.g., a bounty is paid on the sale of one product but not on another), vary depending on online store affiliate identity (e.g., different bounty obligations for different online store affiliates), or vary depending on online store affiliate type (e.g., different bounty obligations for retail store affiliates and network provider affiliates).

The online store affiliate obligation application process 600 begins by retrieving 601 an obligation configuration file for a particular online store affiliate, for example a database entry containing information about the circumstances under which a bounty is paid to a particular online store affiliate. An obligation configuration file can contain information about how to process bounties and other obligations in different states or countries. Further, an obligation configuration file can contain information that is used to determine if the sale of a particular online store product incurs a bounty obligation. Further still, an obligation configuration file can contain information about how to calculate a wide variety of bounty types (e.g., formulas used to calculate bounties.) Next, any and all bounty obligations are processed 603 according to the information contained in the retrieved 601 obligation configuration file. Following block 603, the online store obligation application process 600 can end.

Figure 7:
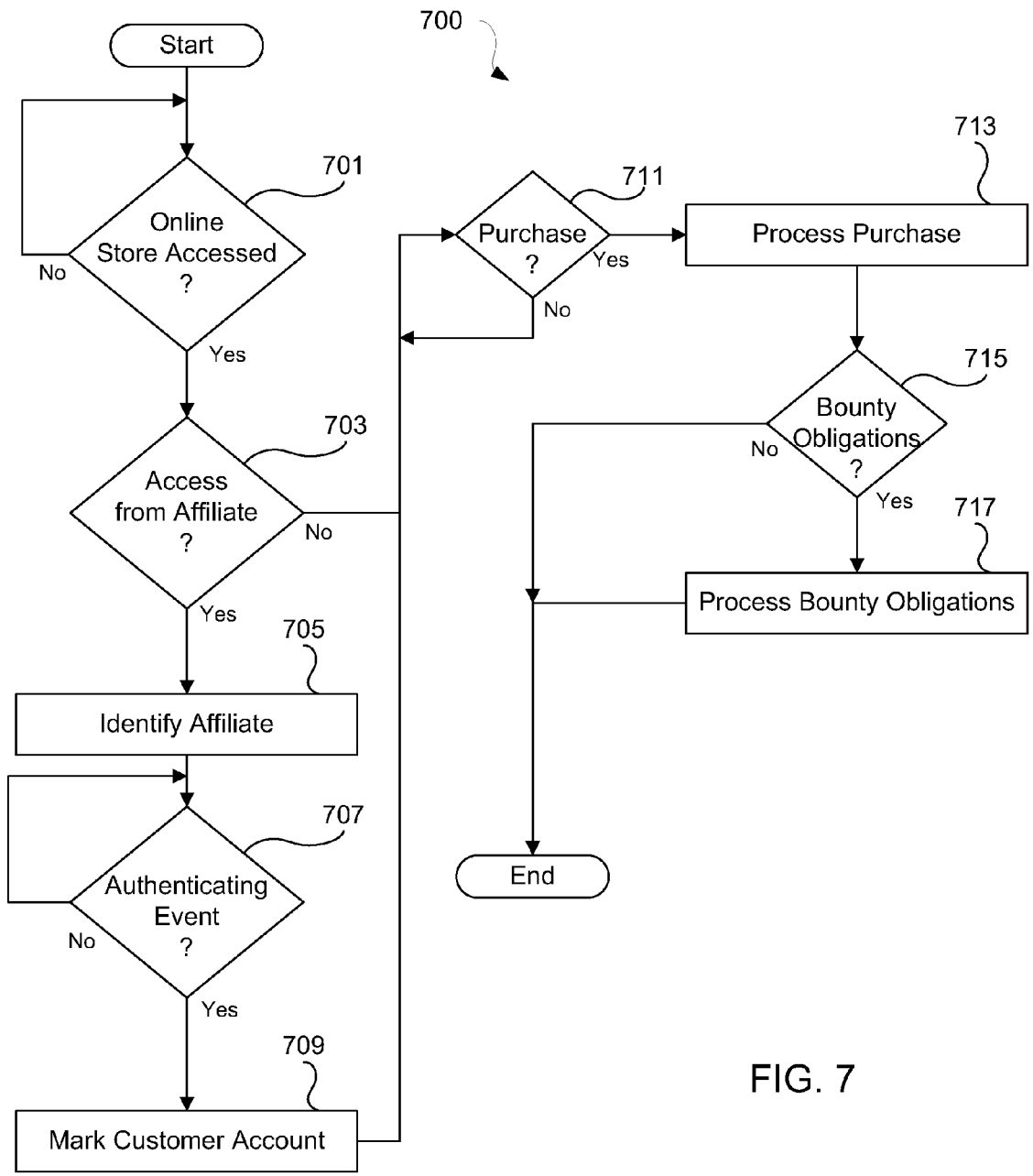
FIG. 7 is a flow diagram of a customer marking event detection process according to one embodiment of the invention.

FIG. 7 is a flow diagram of an online store affiliate crediting process 700 according to one embodiment of the invention. The online store affiliate crediting process 700 can represent a single online session between an online store customer and an online store. The online store affiliate crediting process 700 can describe an interaction between for example, the client devices 209, 211, and 213 and the online store 201 as described in FIG. 2 above.

The online store affiliate crediting process 700 begins with a decision 701 that determines 701 at an online media store has been accessed, for example by a customer browsing the online store using a Web browser. Once decision 701 detects that the online media store has been accessed, the online store affiliate crediting process 700 continues to a decision 703 that determines if the online store was accessed from an affiliate establishment data network, for example the affiliate establishment data network 207' of FIG. 2. If decision 703 determines that the online store was not accessed from an affiliate establishment data network, then the online store affiliate crediting process 700 continues to block 711 and subsequent blocks. If, on the other hand, decision 703 determines that the online store was accessed from an affiliate establishment data network, then the online store affiliate crediting process 700 identifies 705 the affiliate location (e.g., store number or establishment data network) that was used to access the online store, for example by using online store affiliate location information reported by the online store affiliate network. Next, the online store affiliate crediting process 700 continues to a decision 707 that determines that an authenticating event has occurred. An authenticating event, as described above in reference to FIG. 4 is an interaction with an online store that informs the online store of the identity of the customer that is interacting with the online store. One type of authenticating event occurs when a customer "logs onto" his account at an online store. Another example of an authenticating event, also discussed above in reference to FIG. 4, occurs when a wireless enabled mobile device that is associated with a unique customer account accesses an online store. If decision 707 determines that an authenticating event has occurred, the customer account associated with the authenticating event is marked, for example as described in the online store customer account marking process 400 of FIG. 4 above.

Next, the online store affiliate crediting process 700 continues to a decision 711 that determines if a purchase request has been made. Once decision 711 determines that a purchase has been made, the online store affiliate crediting process 700 continues by processing 713 the purchase. As discussed above in FIG. 1, processing 103 typically involves such steps as collecting payment information from the purchaser, processing the payment information, and arranging for the product or service purchased to be delivered to the purchaser.

Once the purchase has been processed 713, the online store affiliate crediting process 700 continues with a decision 715 determines if one or more bounty obligations are owed to one or more online media store affiliates for the purchase, for example as determined by the online store affiliate obligation application process 600 of FIG. 6 above. If the decision 715 determines that bounty obligations are owed then the bounty obligations are processed 717 and the online store affiliate crediting process 700 can end. Otherwise, if the decision 715 determines that no bounty obligations are owed, then the online store affiliate crediting process 700 can end.

Figure 8:
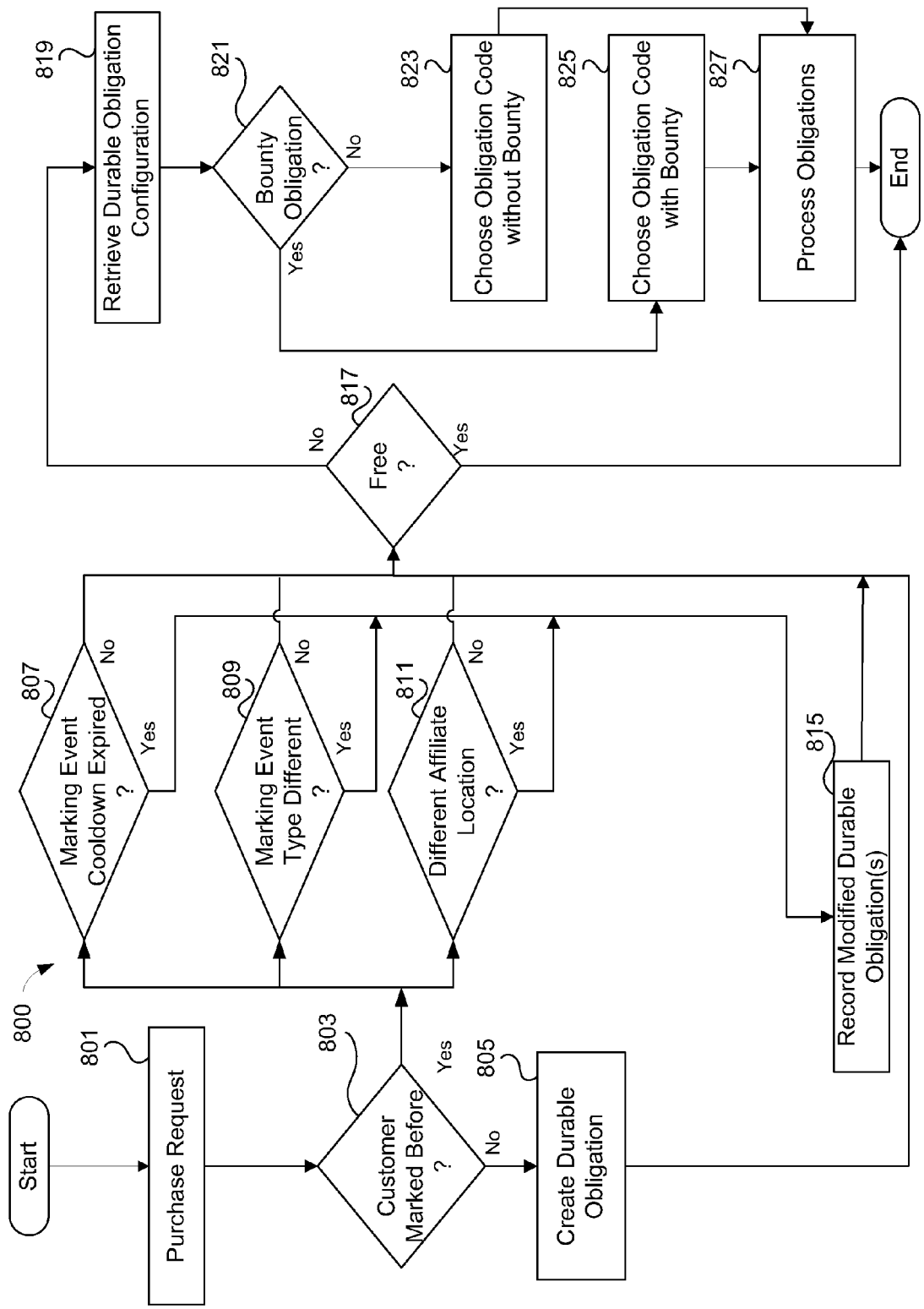
FIG. 8 is a flow diagram of an online store purchase flow 800 according to one embodiment of the invention.

FIG. 8 is a flow diagram of an online store purchase flow 800 according to one embodiment of the invention.

The online store purchase flow 800 begins with a purchase request 801, received at an online store. The purchase request 801 includes necessary information to fulfill a purchase from the online store, for example an online store customer account to which the purchase will be charged. Next, a decision 803 determines if the online store customer account has been previously affiliate-marked with durable obligations. If not, a durable obligation is created 805 for that purchase and recorded in the customer account. On the other hand, if the decision 803 determines that the online store customer account has been previously marked, decisions 807, 809, and 813 are reached.

As described above in reference to FIG. 5, decisions 807, 809, and 811 each check to see if the durable obligations on the affiliate-marked customer account need to be updated. Decisions 807, 809, and 811 each check for conditions that require the recording of additional or different durable obligations in the affiliate-marked online store customer account. If any of decisions 807, 809, and 811 are answered in the affirmative, then the new or modified durable obligations are recorded 815 in the customer account. On the other hand, if none of the decisions 807, 809, and 811 are answered in the affirmative, then the online store purchase flow 800 continues to block 817. For a discussion of decision 807, see the discussion of decision 505 in FIG. 5. For discussion of decision 809, see the discussion of decision 511 in FIG. 5. For discussion of decision 811, see the discussion of decision 513 in FIG. 5.

Regardless of whether a new durable obligation was created 805 or new or modified durable obligations were recorded 815, the online store purchase flow 800 continues to decision 817 which determines if the purchase 801 is an actual purchase to be charged to the customer account or the redemption of a free product code, for example a promotional gift distributed by an online store affiliate. If decision 817 determines that the purchase 801 is the reduction of a free product code, then the online store purchase flow 800 continues to block 827 and subsequent blocks. On the other hand, if decision 817 determines that the purchase 801 is an actual purchase, then the online store purchase flow 800 retrieves 819 a durable obligation configuration as described in block 601 of FIG. 6 above. Next, a decision 821 determines if any bounty obligations are owed based on the durable obligation configuration. If decision 821 determines that no bounty obligations are owed, then obligation codes that do not require a bounty payment are chosen 823 from the durable obligation configuration. On the other hand, if decision 821 determines that one or bounty obligations are owed, then bounty obligation codes are chosen from the durable obligation configuration. Regardless of which type of bounty obligation code was chosen 823 or chosen 825 from the durable obligation configuration, the durable obligations are processed 827. The processing of durable obligations can include paying bounty obligations, recording other durable obligations in a database, and/or reporting purchase information to online store affiliates.

Figure 9A:
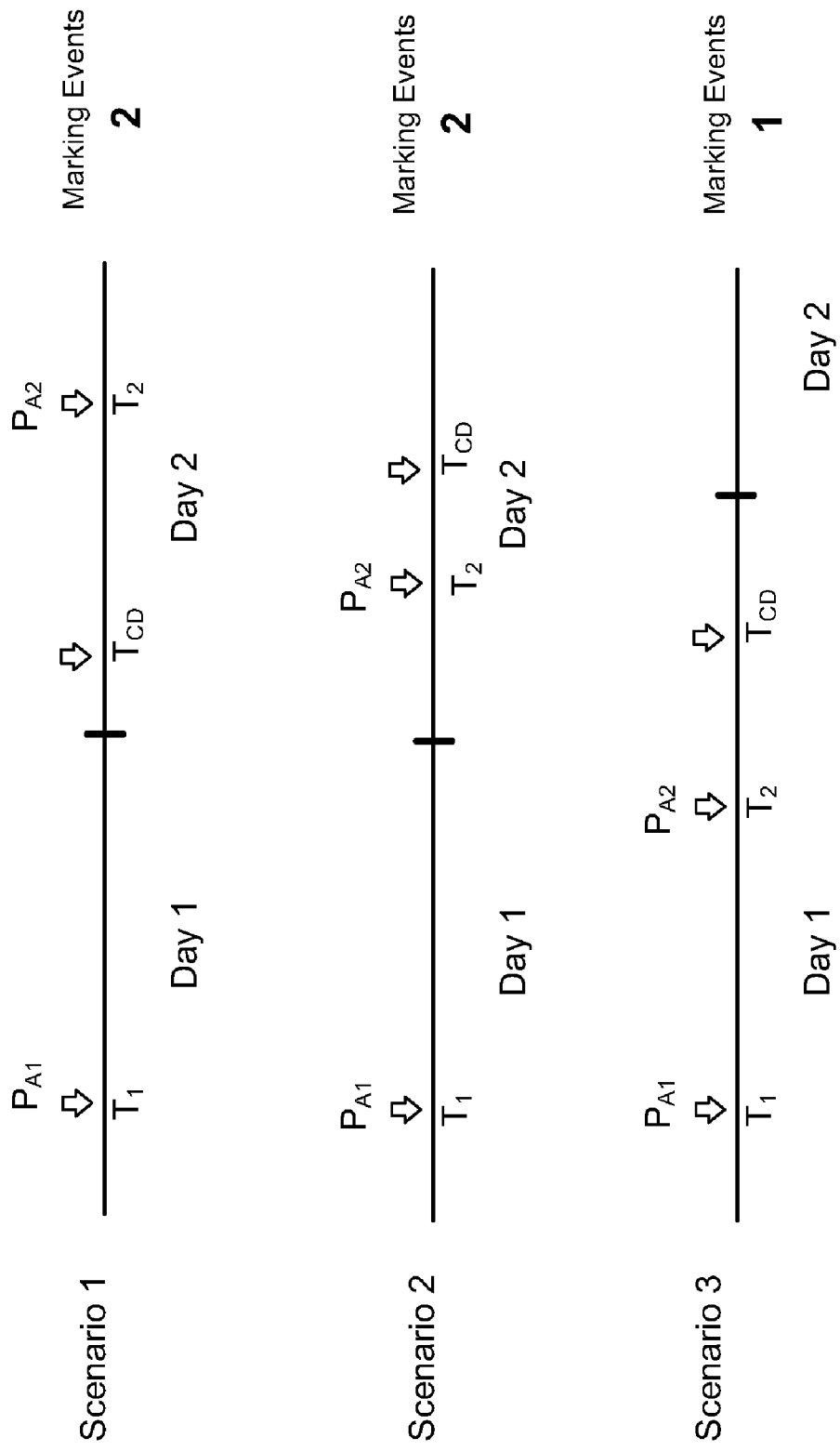

FIGS. 9(a) and 9(b) are diagrams of examples of detecting and recording marking events as described in FIG. 4 and FIG. 5.

Scenarios 1-6 show a series of marking event scenarios of the detecting of unique online store account affiliate-marking events. Scenarios 1-6 demonstrate applications of the online store customer account marking event detection process 400 as described above in FIG. 4. Two marking event types are shown: purchases and authenticating events. Authenticating events are described in block 707 of FIG. 7 above. In each scenario, all purchases and authenticating events are made from the same online customer account. Purchases and authentications occur from one or more of three online affiliate networks: Affiliate A, Affiliate B, and Affiliate C. All purchases have the same marking event priority. Authenticating events have lower marking event priority than purchases. Additionally, subsequent events that occur in different affiliate locations are regarded as unique events. Finally, in scenarios 1-6, a marking event cool down timer begins at time $T_1$ and ends at time TCD.

In scenario 1, a purchase $PA_1$ is made at time $T_1$ from Affiliate A. At time $T_2$ a second purchase $PA_2$ is made from Affiliate A. Since the cool down timer expired at time TCD, both $PA_1$ and $PA_2$ are recorded.

In scenario 2, a marking event rule has been set such that marking events detected on different calendar days are detected even if the marking event cool down timer has not expired. A purchase $PA_2$ is made at time $T_1$ from Affiliate A on day one. A second purchase from Affiliate A, $PA_2$, occurs at time $T_2$ on day two, but before the cool down timer has expired at time TCD. However, the fact that the two purchases are made on different calendar days means that both $PA_1$ and $PA_2$ are recorded.

In scenario 3, two purchases are made from Affiliate A. The first purchase $PA_1$ is made at time $T_1$ and the second purchase $PA_2$ is made at time $T_2$. However, at time $T_2$, the cool down timer has not yet expired. Thus purchase $PA_2$ is ignored and only $PA_1$ is recorded.

In scenario 4, a purchase $PA_1$ is made in Affiliate A at time $T_1$. Next, before the marking cooldown expires at time TCD, an authenticating event $AE_A$ occurs in Affiliate A. Since authenticating events have lower priority than purchases, and the cool down timer has not expired, $AE_A$ is ignored and only $PA_1$ is recorded.

In scenario 5, an authenticating event $AE_A$ occurs in Affiliate A at time $T_1$. At time $T_2$ a purchase PA is made in Affiliate A. Since purchases have higher priority than authenticating events, both $AE_A$ and PA are recorded.

In scenario 6, a purchase $PA_1$ occurs in affiliate A at time $T_1$. Next a purchase $PB_1$ occurs in Affiliate B at time $T_2$ (resetting the cooldown timer to $TCD_2$). Finally, at time $T_3$, and authenticating event $AE_A$ occurs in Affiliate A. Even though all three events occur before the associated cool down timers expire, all three are recorded. $PA_1$ is recorded because it is the first event, $PB_1$ is recorded because it occurs in a different affiliate that $PA_1$, and $AE_A$ is recorded because it occurs in a different Affiliate than $PB_1$.

It should also be noted that there are many alternative ways of implementing the methods and apparatuses of the present invention. For example, the invention is preferably implemented by software, but can also be implemented in hardware or a combination of hardware and software. The invention can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

It is therefore intended that the following appended claims be interpreted as including all such alterations, permutations, and equivalents as fall within the true spirit and scope of the present invention.

What is claimed is:

1. A non-transitory computer-readable medium including at least computer program code stored thereon for paying a bounty to an online store affiliate for purchases made at an online store, comprising:
    computer program code for detecting an online store customer marking event for a customer at an online store when the online store customer accesses the online store over an online store affiliate network;
    computer program code for marking the online store customer as associated with the online store affiliate, and wherein the marking of the online store customer expires after a predetermined period of time; and
    computer program code for subsequently paying a bounty to the online store affiliate for purchases made from the online store by the marked online store customer.

2. The non-transitory computer-readable medium of claim 1, wherein said computer program code for marking the online store customer operates to mark an online store customer account that corresponds to the online store customer.

3. The non-transitory computer-readable medium of claim 2, wherein, if said computer program code for detecting detects a new online store customer marking event occurs before the predetermined period of time lapses, the predetermined period of time is reset.

4. The non-transitory computer-readable medium of claim 1, wherein the online store customer marking event occurs when the online store customer makes a purchase from the online store using an online store affiliate gift card.

5. The non-transitory computer-readable medium of claim 4, wherein no bounty is paid when the online store customer makes a purchase from the online store using the online store affiliate gift card.

6. The non-transitory computer-readable medium of claim 5, wherein the online store affiliate gift card is a product specific gift card.

7. The non-transitory computer-readable medium of claim 5, wherein the online store affiliate gift card is contains a promotional code redeemable for a free product.

8. The non-transitory computer-readable medium of claim 1, wherein the online store customer marking event occurs when the customer makes a purchase from the online store using an online store gift card purchased from the online store affiliate.

9. The non-transitory computer-readable medium of claim 8, wherein no bounty is paid when the customer makes a purchase from the online store until the online store gift card has been fully redeemed.

10. The non-transitory computer-readable medium of claim 1, wherein said computer program code for detecting of an online store customer marking event comprises computer program code for checking whether the online store customer was marked within a predetermined period of time, and wherein said computer program code for marking of the online store customer occurs again for the same online store customer only if the online store customer was previously marked more that the predetermined period of time earlier.

11. The non-transitory computer-readable medium of claim 1, wherein said computer program code for marking of the online store customer occurs when the online store customer makes a purchase.

12. The non-transitory computer-readable medium of claim 1, wherein said computer program code for detecting of an online store customer marking event comprises:
    computer program code for determining a priority for the detected online store marking event;
    computer program code for determining if a previous online customer marking event has occurred; and
    computer program code for determining a priority for the previous the previous online customer account marking event.

13. The non-transitory computer-readable medium of claim 12, wherein said computer program code for marking of the online store customer occurs only if the determined priority of the detected online store customer marking event is higher than the determined priority of the previous online customer marking event.

14. The non-transitory computer-readable medium of claim 1, wherein said computer program code for detecting of an online store customer account marking event comprises:
    computer program code for determining an online customer account marking event type for the detected online store marking event;
    computer program code for determining if a previous online customer account marking event has occurred; and
    computer program code for determining an online customer marking event type for the previous online customer account marking event.

15. The non-transitory computer-readable medium of claim 14, wherein said computer program code for marking of the customer account occurs only if the determined online store customer marking event type of the detected online customer marking event is different from the determined online store customer marking event type of the previous online store customer marking event.

16. The non-transitory computer-readable medium of claim 1, wherein the online store is an online media store, and wherein the online store affiliate is a retail establishment.

17. A non-transitory computer-readable medium including at least computer program code stored thereon for paying a bounty to an online store affiliate for purchases made at an online store, comprising:
    computer program code for detecting an online store customer marking event for a customer at an online store when the online store customer accesses the online store over an online store affiliate network;
    computer program code for marking the online store customer as associated with the online store affiliate; and
    computer program code for subsequently paying a bounty to the online store affiliate for purchases made from the online store by the marked online store customer,
    wherein said computer program code for marking of the online store customer comprises:
        computer program code for determining the location of an online store affiliate where the marking event of the online store customer occurred; and
        computer program code for marking the online store customer with information specific to the location of the online store affiliate.

18. A computer-implemented method for paying a bounty to an online store affiliate for purchases made at an online store, comprising:
    detecting an online store customer marking event for a customer at an online store when the online store customer accesses the online store over an online store affiliate network;
    marking the online store customer as associated with the online store affiliate; and
    subsequently paying a bounty to the online store affiliate for purchases made from the online store by the marked online store customer, the paying of the bounty to the online media store affiliate for purchases made from the online store by the marked online store customer comprises (i) retrieving an obligation configuration, and (ii) paying the bounty to the online store affiliate based on the obligation configuration.

19. A system, comprising:

a server computer device that supports an online store and that is configured to couple to a data network for access to an affiliate establishment data network, wherein said server computer device is configured to pay a bounty to an online store affiliate for purchases made at the online store, in doing so, said server computer device is further configured to perform the operations of:

detecting an online store customer marking event for a customer at the online store when the online store customer accesses the online store over the online store affiliate network;

marking the online store customer as associated with the online store affiliate, and wherein the marking of the online store customer expires after a predetermined period of time; and subsequently paying a bounty to the online store affiliate for purchases made from the online store by the marked online store customer.

20. The system of claim 19, wherein the online store is an online media store, and wherein the online store affiliate is a retail establishment.

\* \* \* \* \*

UNITED STATES PATENT AND TRADEMARK OFFICE
CERTIFICATE OF CORRECTION

PATENT NO. : 8,321,294 B2
APPLICATION NO. : 13/361882
DATED : November 27, 2012
INVENTOR(S) : Carlier et al.

Page 1 of 1

It is certified that error appears in the above-identified patent and that said Letters Patent is hereby corrected as shown below:

ON THE TITLE PAGE:
Item (73), change "Aople Inc." to --Apple Inc.--.

IN THE CLAIMS:
Col. 16, line 4, delete "the previous".

Signed and Sealed this
Tenth Day of November, 2015

Michelle K. Lee
*Director of the United States Patent and Trademark Office*

UNITED STATES PATENT AND TRADEMARK OFFICE
CERTIFICATE OF CORRECTION

PATENT NO. : 8,321,294 B2
APPLICATION NO. : 13/361882
DATED : November 27, 2012
INVENTOR(S) : Claude P. Carlier et al.

Page 1 of 1

It is certified that error appears in the above-identified patent and that said Letters Patent is hereby corrected as shown below:

TITLE PAGE:

This certificate supersedes the Certificate of Correction issued November 10, 2015.
Item [73], Assignee, "Apple Inc." (as corrected to read in the Certificate of Correction issued November 10, 2015) is deleted and patent is returned to its original state with the assignee name in patent to read -- Aople Inc., Cupertino, CA (US) --

Signed and Sealed this
Twenty-second Day of December, 2015

Michelle K. Lee
*Director of the United States Patent and Trademark Office*